(12) United States Patent
Green et al.

(10) Patent No.: US 6,370,299 B1
(45) Date of Patent: Apr. 9, 2002

(54) FIBER OPTIC COLLIMATION APPARATUS AND ASSOCIATED METHOD

(75) Inventors: Samuel I. Green, St. Louis, MO (US); Robert Rex Rice, Simi Valley, CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/672,522

(22) Filed: Sep. 27, 2000

(51) Int. Cl.[7] .............................. G02B 6/42; G02B 6/255
(52) U.S. Cl. ........................................ 385/33; 359/291
(58) Field of Search ................................. 359/223, 224, 359/199, 212, 221, 291; 385/88, 90, 93, 73

(56) References Cited

U.S. PATENT DOCUMENTS

| | | |
|---|---|---|
| 4,509,827 A | 4/1985 | Cowen et al. |
| 4,540,278 A | 9/1985 | Phillips |
| 4,637,683 A | 1/1987 | Asawa |
| 4,746,195 A | 5/1988 | Auracher et al. |
| 4,812,654 A | 3/1989 | Araujo |
| 4,840,450 A | 6/1989 | Jones et al. |
| 5,602,955 A | 2/1997 | Haake |
| 5,606,635 A | 2/1997 | Haake |
| 5,870,518 A | 2/1999 | Haake et al. |
| 5,881,198 A | 3/1999 | Haake |
| 6,256,131 B1 * | 7/2001 | David et al. ................. 359/199 |
| 6,280,100 B1 * | 8/2001 | Haake ........................... 385/73 |
| 6,285,489 B1 * | 9/2001 | Mark et al. .................. 359/291 |

* cited by examiner

*Primary Examiner*—Akm E. Ullah
(74) *Attorney, Agent, or Firm*—Alston & Bird LLP

(57) ABSTRACT

The collimation apparatus includes a plurality of optical fibers for providing respective primary optical signals. The collimation apparatus also includes a plurality of collimating lenses. Each collimating lens collimates the primary optical signals provided by a respective optical fiber. The collimation apparatus further includes a common reflector for reflecting the collimated optical signals back to the respective collimating lens. These reflections produce a return optical signal from each collimated optical signal. The collimation apparatus also includes at least one detector for receiving the return optical signals and a plurality of actuators for iteratively positioning the optical fibers based on the magnitude of the detected signals. By positioning the optical fibers relative to the respective collimating lenses such that the magnitude of the return signals is maximized, the collimation method and apparatus can accurately position the ends of the optical fibers at the focal points of the respective collimating lenses. The fiber optic autocollimation method and apparatus collimates the radiation from many fibers through many lenses with a common flat reference mirror, so that the resultant beams all point in the same direction.

17 Claims, 3 Drawing Sheets

Co-collimate multiple sources by referencing to common mirror

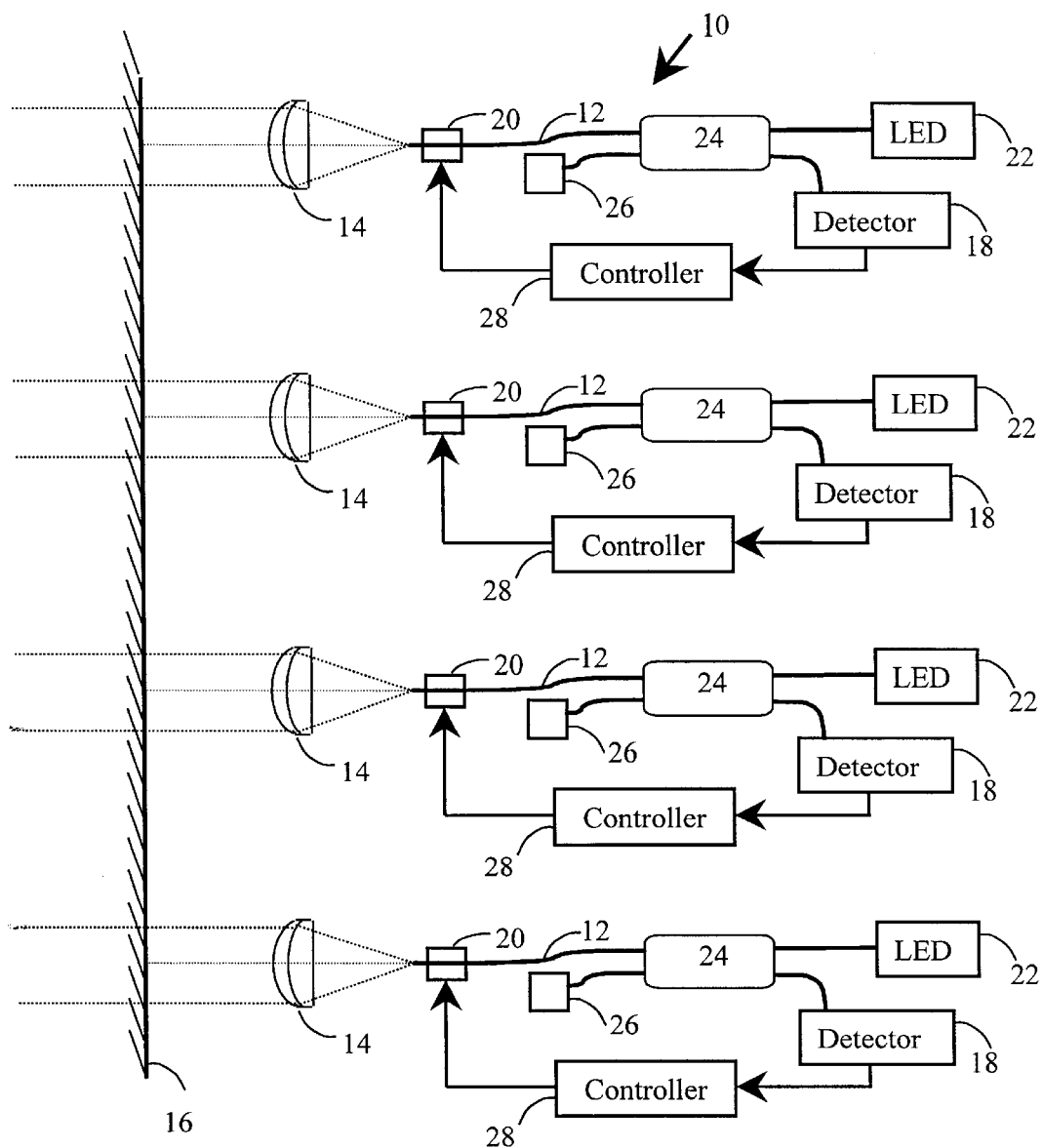
Figure 1 Co-collimate multiple sources by referencing to common mirror

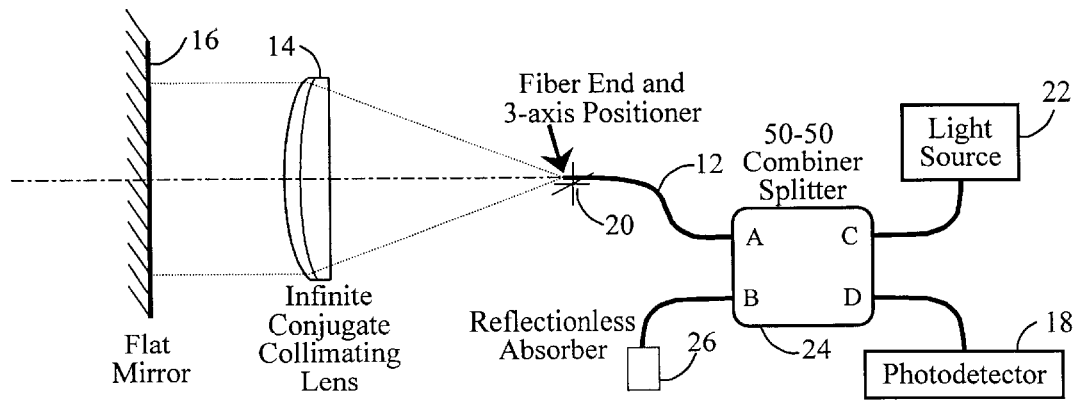
Figure 2  Fiber End On Axis and in Focus
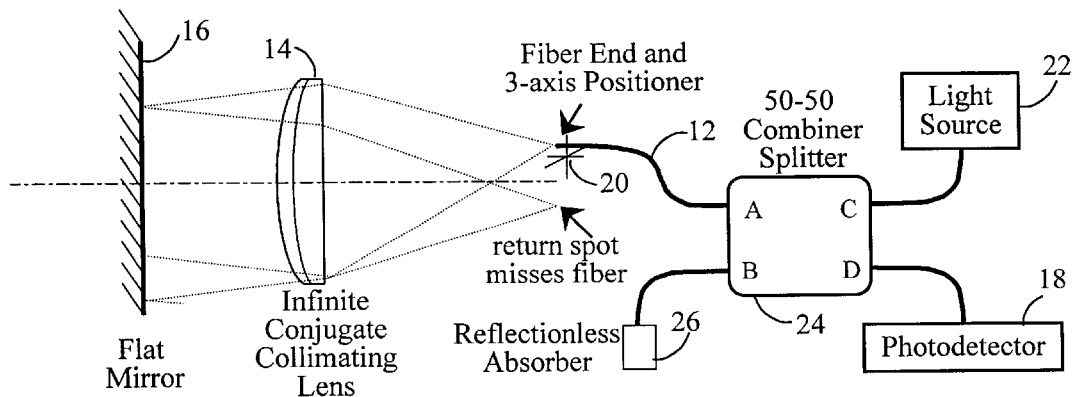
Figure 3  Fiber End Off Axis and in Focus
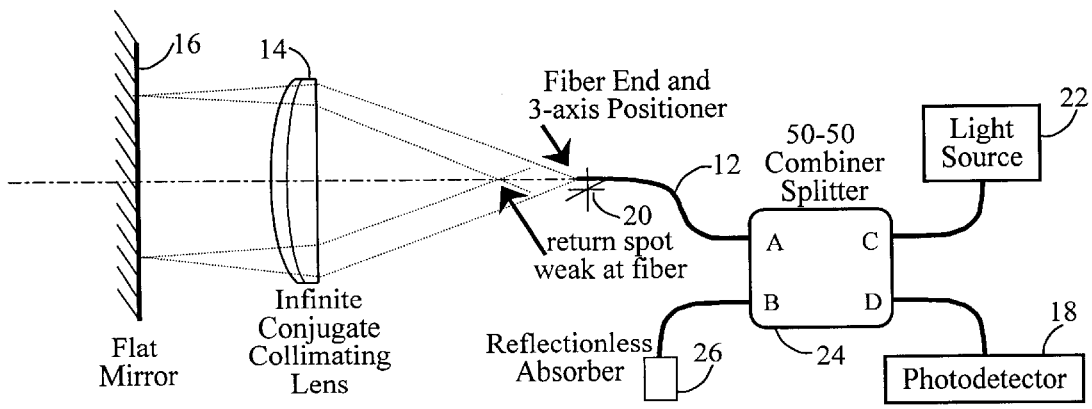
Figure 4  Fiber End On Axis and Out of Focus

FIBER OPTIC COLLIMATION APPARATUS AND ASSOCIATED METHOD

FIELD OF THE INVENTION

The present invention relates generally to collimation techniques and, more particularly, to an apparatus and method for controllably positioning multiple optical fibers relative to respective collimating lenses.

BACKGROUND OF THE INVENTION

It is desirable in many applications to collimate the optical signals emitted by each of a plurality of optical fibers. For example, the optical signals emitted by a plurality of optical fibers are preferably collimated prior to transmission to achieve the smallest divergence optical beam and to direct the greatest portion of the optical energy from all fibers onto the smallest target point in the far field. By collimating optical signals prior to transmission and by steering each collimated beam in the same direction, the greatest power arrives at the target point in the far field.

Optical signals emanating from a small source region are generally collimated by placing the source region at the focal point of a lens. Optical signals from an optical fiber emanate from a small region and are generally collimated by means of a collimating lens disposed proximate one end of an optical fiber. Optical signals are typically coupled into an optical fiber by focusing onto the end of an optical fiber by means of a focusing lens. The collimating and focusing operations are complementary, interchangeable, and reversible. The same lens, i.e., a collimating lens, both collimates the diverging optical signals emitted by an optical fiber and focuses collimated light onto the optical fiber. In order to minimize transmission losses due to the lens, the lens is preferably coaxially positioned with respect to the optical fiber such that the end of the optical fiber is coincident with the focal point of the lens. If the fiber is moved along the collimating lens axis and positioned such that the end of the optical fiber is offset from the focal point of the collimating lens, a transmitted beam will be either convergent or divergent, thereby decreasing the concentration of energy that reaches a target spot in the far field. If the end of the fiber remains at the focal distance from the lens but is displaced from the lens axis, the beam will steer away from the target point. Similarly, during the reception of optical signals, if the lens is moved off axis or is positioned such that the end of the optical fiber is offset from the focal point of the lens, the focal point of the received signals misses the end of the optical fiber. Moreover, even if the lens is properly positioned, the lens will be unable to precisely focus the optical signals onto the end of an optical fiber if the received signals are not collimated and are, instead, divergent or convergent. Thus, efficient signal transmission demands that the optical signals be collimated.

Several techniques have been developed to determine if optical signals have been appropriately collimated. One technique for determining the collimation of highly coherent optical signals utilizes a Shearing interferometer having a slightly wedged glass plate which creates an interference pattern by overlapping reflections from the front and rear surfaces of the slightly wedged plate. The resulting interference pattern provides information relating to the degree of collimation of the original wavefront. By monitoring the interference fringes generated by the Shearing interferometer as a collimating lens and an end of an optical fiber are moved relative to one another, the degree of collimation provided by the collimating lens can be optimized. In instances in which the optical signals are incoherent, a Shearing interferometer is useless, and the collimation of the optical signals is typically performed in a less exact manner by moving the collimating lens and the end of the optical fiber relative to one another and subjectively determining when the resulting spot "looks good" in the far field.

Conversely, in order to properly position a focusing lens relative to the end of an optical fiber, a test source typically provides collimated optical signals that are focused by the lens onto an optical fiber and the resulting optical signals that emerge from the other end of the optical fiber are measured with a power meter. In order to insure that the optical signals provided by a coherent test source are collimated, a Shearing interferometer can be utilized. By moving the focusing lens and the end of the optical fiber relative to one another and by measuring the respective power levels of the optical signals emitted by the optical fiber, the focusing lens can be positioned in that location which results in the largest percentage of the optical signals being focused onto the end of the optical fiber as evidenced by the maximum power reading. If the test source is collimated, then maximum power is read at the true focus.

By way of example, one technique for aligning an optical fiber within a connector has been described by U.S. Pat. No. 4,509,827 which issued Apr. 9, 1985 to Steven J. Cowen (hereinafter the Cowen '827 patent). The alignment system described by the Cowen '827 patent includes a light emitting diode for emitting optical signals and a directional coupler for coupling the optical signals into an optical fiber. The alignment system of the Cowen '827 patent also includes a graded index (GRIN) lens disposed within a connector body for receiving signals from the optical fiber and a reference mirror placed orthogonal to the preferred light direction for reflecting the optical signals back through the GRIN lens and into the optical fiber. The alignment system of the Cowen '827 patent further includes a photodetector, also connected to the directional coupler, for receiving the reflected optical signals. In order to appropriately align the optical fiber within the connector body, the alignment system includes a micropositioner that moves the end of the optical fiber relative to the GRIN lens until the photodetector indicates the maximum power level. Thereafter, the optical fiber can be fixed in position relative to the lens within the connector body, such as by potting the end of the optical fiber with a suitable material. The alignment technique described by the Cowen '827 patent is designed to align a single optical fiber to a single lens. In applications in which a plurality of optical fibers must be aligned, the alignment technique described by the Cowen '827 patent results in each fiber being suitably aligned to a corresponding lens, but the resulting, many collimated beams will point in as many directions.

SUMMARY OF THE INVENTION

A fiber optic collimation apparatus and an associated method are therefore provided that utilize a common reference mirror to collimate the optical signals emitted by a plurality of optical fibers. In this regard, the fiber optic collimation apparatus and method of the present invention can optimally position each of a plurality of optical fibers relative to respective collimating lenses.

The fiber optic collimation apparatus includes a plurality of optical fibers for providing respective primary optical signals and a plurality of collimating lenses, each of which is positioned to collimate the primary optical signals provided by a respective optical fiber. In one embodiment, the plurality of collimating lenses lies in a common lens plane such that each collimated optical signal is parallel to all other collimated optical signals after suitable adjustments have been made according to this method. The fiber optic collimation apparatus also includes a common reflector spaced from the plurality of collimating lenses and having a surface that defines a reflection plane orthogonal to the preferred direction of propagation of the collimated optical signals. The common reflector therefore reflects each of the collimated optical signals to produce respective return optical signals that are directed to the respective collimating lenses and, in turn, to the respective optical fibers. The fiber optic collimation apparatus further includes at least one detector for receiving the return optical signals and for determining a magnitude of the return optical signals. In one embodiment, for example, the fiber optic collimation apparatus includes a plurality of detectors for receiving return optical signals from respective optical fibers.

The fiber optic collimation apparatus also includes a plurality of actuators connected to respective optical fibers for iteratively positioning each optical fiber in a plurality of positions relative to the respective collimating lens. For example, each actuator can advantageously be a microelectromechanical optical fiber alignment device for positioning a respective optical fiber, typically in each of three orthogonal axes. The detector is designed to determine the magnitude of the return optical signals for each of the plurality of positions in which the actuator places the respective optical fiber. The actuators can thereafter fix the position of the optical fibers based upon the magnitude of the return optical signals. In particular, the fiber optic collimation apparatus can include a controller for controlling the actuators based upon the magnitude of the return optical signals received by the detectors. Typically, the controller directs the actuators to fix the position of each optical fiber at a position in which the return optical signals for the respective optical fiber have the maximum magnitude. By maximizing the magnitude of the return optical signals, the ends of the optical fibers will be positioned at the focal points of the respective collimating lenses such that the primary optical signals emitted by the optical fibers can be properly collimated and directed by the lenses and the return optical signals can be appropriately focused onto the ends of the respective optical fibers.

In order to position each optical fiber iteratively in a plurality of positions relative to the respective collimating lens, an actuator may first defocus the collimating lens by moving the respective optical fiber such that the detector indicates a return optical signal having a small magnitude. Thereafter, the actuator can iteratively position the respective optical fibers such that the detector indicates return optical signals having greater magnitudes. The controller can then determine the maximum magnitude of the return optical signals and the actuator can thereafter position the respective optical fiber with respect to the respective lens so as to produce return optical signals having the maximum magnitude, thereby evidencing that the end of the optical fiber is at the focal point and on the optic axis of the lens.

A fiber optic collimation apparatus can also include a plurality of light sources for providing the primary optical signals for purposes of alignment. In addition, the fiber optic collimation apparatus can include a plurality of directional couplers. Each directional coupler interconnects the respective light source, optical fiber and detector. Thus, each directional coupler provides the primary optical signals from the respective light source to the optical fiber and receives the return optical signals from the optical fiber for routing to the respective detector.

In operation, a plurality of primary optical signals is provided by respective optical fibers. Each of the plurality of primary optical signals is then individually collimated to produce respective collimated optical signals. Each collimated optical signal is reflected from a common reflection plane disposed orthogonal to the preferred direction of propagation of the collimated optical signals, thereby creating a return optical signal from each collimated optical signal. The magnitude of each return optical signal is then determined. The optical fiber is iteratively positioned in a plurality of different positions with the magnitude of the return optical signals being separately determined at each position. Thus, the position of each optical fiber can be fixed in a final position based on the magnitude of the return signals. In particular, the position of each optical fiber can be fixed such that the return optical signals have a maximum magnitude, thereby effectively positioning the end of the optical fiber at the focal point and on the optic axis of the respective lens.

Note that if the lenses in the array in the lens plane are placed with slight errors in angle or position so that all lens axes are not exactly parallel or exactly spaced, the alignment process will still result in co-collimated beams, all pointing in the same direction orthogonal to the reference reflector, however the associated fiber ends may not lie exactly on the axes of the respective lenses and not be regularly spaced, thus compensating for the errors.

The fiber optic collimation apparatus and method of the present invention therefore permits a plurality of optical fibers to be precisely positioned relative to respective collimating lenses such that the optical signals emitted by the optical fibers are collimated and such that collimated signals that are received by the collimating lenses are properly focused upon the end of the respective optical fibers. Thus, the fiber optic collimation apparatus and method of the present invention should reduce transmission losses, both in signal power and signal integrity. Notably, the fiber optic collimation apparatus and method efficiently position a plurality of optical fibers relative to respective collimating lenses by reflecting the collimated optical signals from a common reflector, thereby assuring that all of the plurality of collimated beams point in the same preferred direction.

BRIEF DESCRIPTION OF THE DRAWINGS

FIG. 1 is a block diagram of a fiber optic collimation apparatus according to one embodiment of the present invention.

FIG. 2 is a schematic diagram tracing the path of an optical signal emitted by and reflected to an optical fiber that is desirably positioned at the focal point and on or near the optic axis of a collimating lens.

FIG. 3 is a schematic diagram tracing the path of an optical signal emitted by and reflected to an optical fiber that is spaced from the collimating lens by the focal distance but is offset from the optic axis of the collimating lens.

FIG. 4 is a schematic diagram tracing the path of an optical signal emitted by and reflected to an optical fiber that is on the optic axis but is out of focus relative to the collimating lens.

DETAILED DESCRIPTION OF THE INVENTION

Figure 5:
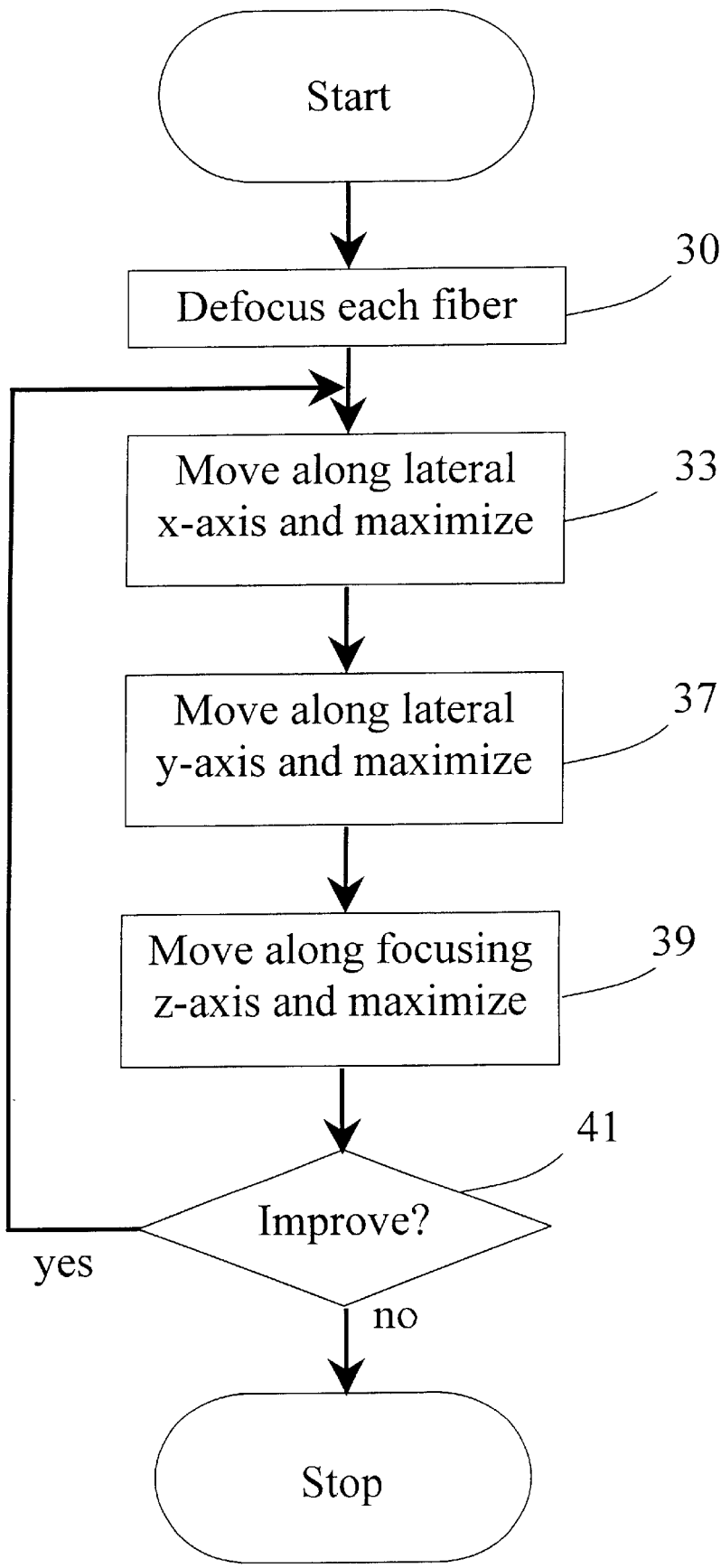
FIG. 5 is a flowchart depicting the operations performed by the fiber optic collimation method and apparatus of one embodiment of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring now to FIG. 1, a fiber optic collimation apparatus 10 for collimating the optical signals emitted by a plurality of optical fibers 12 is illustrated. In addition to the optical fibers, the fiber optic collimation apparatus includes a plurality of collimating lenses 14, one of which is positioned proximate a first end of each optical fiber. As such, primary optical signals emitted by an optical fiber will diverge as indicated by the dashed lines in FIG. 1. Upon reaching the collimating lens, the divergence of the primary optical signals will be slowed, if not minimized, and, if the collimating lens and the end of the respective optical fiber are properly positioned, the optical signals will be collimated, which is a state of minimum divergence. The fiber optic collimation apparatus of the present invention can utilize various types of collimating devices including refractive and diffractive lenses and curved reflectors of varying prescriptions and the like.

The fiber optic collimation apparatus 10 also includes a common reflector 16 spaced from the plurality of collimating lenses 14 and having a flat surface defining a reflection plane for reflecting the optical signals emitted by each of the plurality of optical fibers 12. Thus, the common reflector provides a single reflective surface from which the optical signals emitted by all of the optical fibers are reflected. The common reflector is positioned such that the reflection plane is orthogonal to the preferred direction of propagation of the collimated optical signals so that the return optical signals generated by the reflection of the collimated optical signals are redirected toward the collimating lenses and optical fibers that provided the primary optical signals. As shown in FIG. 2, the return optical signals are preferably focused by the collimating lenses onto the ends of the respective optical fibers such that at least some of the return optical signals propagate along the optical fibers that initially provided the corresponding primary optical signals.

The fiber optic collimation apparatus 10 also includes at least one detector 18 and, more typically, a plurality of detectors, one of which is associated with each optical fiber 12 for receiving the return optical signals and for determining their magnitude. The fiber optic collimation apparatus of the present invention can utilize various types of photosensitive detectors including photodiodes and the like. Based upon the magnitude of the return optical signals, the optical fibers and, in particular, the end portions of the optical fibers can be controllably positioned relative to the respective collimating lenses 14, such as by positioning the end of each optical fiber at a position coincident with the focal point of the respective collimating lens 14 as evidenced by the maximization of the magnitude of the return optical signals. By positioning the end of the optical fiber at a position coincident with the focal point of the respective collimating lens, the optical signals emitted by the optical fiber will be properly collimated by the collimating lens. In addition, the return optical signals that have been reflected by the common reflector 16 will be focused by the collimating lens onto the end of the respective optical fiber if the collimated beams are orthogonal to the common reflector 16. As such, the transmission losses associated with the optical signals transmitted and received by an optical fiber positioned coincident with the focal point of the respective collimating lens will be minimized, thereby correspondingly maximizing the magnitude of the return optical signals received by the detector.

In order to controllably position the optical fibers, the fiber optic collimation apparatus 10 further includes a plurality of actuators 20 connected to respective optical fibers 12 for iteratively positioning each optical fiber in a plurality of positions relative to the respective collimating lens 14. Each actuator is preferably a microelectromechanical optical fiber alignment device, such as the microelectromechanical optical fiber alignment devices described by U.S. Pat. Nos. 5,602,955; 5,606,635 and 5,881,198 to John M. Haake, the contents of each of which are incorporated by reference herein. As described by these patents, the microelectromechanical optical fiber alignment device can include a carrier upon which the end portion of a respective optical fiber is mounted and a plurality of actuator elements for positioning the carrier and, in turn, the end portion of the optical fiber mounted thereupon relative to a respective collimating lens. The microelectromechanical optical fiber alignment device can include various types of actuator elements that deflect in response to electrical or thermal stimuli. Preferably, the microelectromechanical optical fiber alignment device includes an actuator element associated with each of the x, y and z directions such that the end portion of the optical fiber mounted upon the carrier can be controllably and independently positioned in each of these three orthogonal directions.

The fiber optic collimation apparatus 10 also generally includes a light source 22, such as a light emitting diode (LED), associated with each optical fiber 12. The light source generates the primary optical signals that are propagated via the respective optical fiber. In order to permit primary optical signals to be launched into an optical fiber and return optical signals to be received from the optical fiber, the fiber optic collimation apparatus can further include a directional coupler 24 for connecting both the light source and the detector 18 to the second end of a respective optical fiber. As shown in FIG. 1, a directional coupler may have four ports with the light source connected to a first port, the detector connected to a second port and the optical fiber connected to a third port. As such, primary optical signals generated by the light source can be launched into the optical fiber and return optical signals provided by the optical fiber can be directed to the detector. While the fourth port of the directional coupler need not necessarily be terminated, the fourth port can be connected to a reflectionless absorber 26, if so desired.

The primary optical signals that are launched into the second end of each optical fiber 12 by the respective light source 22 exit the opposed first end and diverge as indicated by the dotted lines in FIG. 1. The collimating lens 14 attempts to collimate the primary optical signals, which are then reflected from the common reflector 16. The return optical signals created by the reflection are focused by the collimating lens, preferably onto the first end of the respective optical fiber. Following propagation along the optical fiber, the return optical signals are sensed by the detector 18 which provides a measure of the magnitude or power level of the return optical signals. As shown in FIG. 2, for example, the first end of the optical fiber is positioned on the optic axis of the collimating lens and is spaced from the collimating lens by a distance equal to the focal length f of the collimating lens, thereby permitting the primary optical signals emitted by the optical fiber to be collimated and the return optical signals to be focused onto the first end of the optical fiber when the measured power level of the return optical signals is optimized.

As indicated in FIGS. 3 and 4, the measured power level of the return optical signals will be reduced in instances in which the first end of the optical fiber 12 is either positioned off the optic axis or is spaced from the collimating lens by a distance other than the focal length. In FIG. 3, for example, the first end of the optical fiber is spaced from the collimating lens by the focal distance, but is off the optic axis such that the return signals may miss the fiber end entirely. Alternatively, in FIG. 4, the first end of the optical fiber is on the optic axis, but is spaced from the collimating lens by a distance other than the focal distance such that the return signals are out of focus at the fiber end and decrease signal coupled into the fiber.

This process of launching primary optical signals into an optical fiber 12 and detecting the corresponding return optical signals is preferably performed at each of a plurality of positions for each of the plurality of optical fibers to determine the direction of displacement to achieve an improvement, and eventually the optimum position in all three axes for each optical fiber. Typically, each actuator 20 positions the end of the respective optical fiber at a location that is somewhat displaced from the focal point of the collimating lens 14 so as to defocus the signal returning into the fiber, as depicted in block 30 of FIG. 5, and thus assure that some small but measurable signal returns into the fiber. The magnitude of the return optical signals measured by the detector 18 can be relatively small or even immeasurable without this initial defocusing step, if all of the return optical signals are focused away from the end of the optical fiber. Thereafter, each actuator controllably positions the respective optical fiber in each of a plurality of different positions and the magnitude of the return optical signals are measured by the detector while the optical fiber is in each position. For a collimating lens defining an optic axis that is designated the z-axis, the actuator can initially move the end of the optical fiber laterally along an orthogonal axis designated the x-axis while maintaining the end of the optical fiber at the same relative position in the y- and z-directions. Based upon the magnitude of the return signals sensed at each of a plurality of positions along the x-axis, the controller can determine the direction of displacement to achieve an improvement and force the actuator to place the end of the optical fiber in that position at which the magnitude of the return signals are maximized. See block 33. This step can then be repeated in order to position the end of the optical fiber along the y-axis and, in turn, along the z-axis. See blocks 37 and 39. The entire process of positioning the end of the optical fiber along the x, y and z-axes can then be repeated until the magnitude of the return signals no longer improves, at which point the end of the optical fiber should be coincident with or very near the focal point of the collimating lens. See block 41. Each actuator can then maintain the position of the respective optical fiber by fixing its position. The process of moving the fiber end in three dimensions while maximizing signals to achieve best focus is well known to those skilled in the optics art as adjustment of a spatial filter, when the fiber end is replaced with a small pinhole.

In most embodiments of this invention, the alignment will be performed, and then the second ends of all fibers will be disconnected from the alignment system and connected to an array of optical sources or detectors. Said sources or detectors are then disposed to illuminate or view the same target area in the far field, this being the purpose of the alignment procedure. For realignment, the second ends of each fiber again need to be reconnected to the respective alignment systems.

In some embodiments of this invention, the alignment mechanism will remain attached and operate intermittently or continuously to maintain system alignment. Then the useful output must pass through the flat plate reflector which becomes a partially reflecting plane reflector, such as a mirror made to be partially transmitting and partially reflecting. A flat piece of glass with an anti-reflection coating on one side is a candidate reflector that will transmit about 96% of incident radiation and reflect about 4% of incident radiation.

According to the present invention, each of the plurality of optical fibers 12 can be iteratively positioned at the same time since an actuator 20, such as a microelectromechanical optical fiber alignment device, is associated with each optical fiber. In this regard, the microelectromechanical optical fiber alignment devices, such as described by the aforementioned patents to John M. Haake, can be formed in mass upon a common substrate in a mass array, such as a linear array, of the microelectromechanical optical fiber alignment devices. Said array of alignment devices can advantageously be utilized to position a plurality of optical fibers. Thus, the actuators can iteratively position the ends of each of the optical fibers at each of a plurality of positions. When the detector 18 associated with each optical fiber indicates the maximum magnitude of the return optical signals for the respective optical fiber, actuators have individually positioned each of the optical fibers at, or near, the focal point of the respective collimating lens 14. Additionally, all beams are directed in parallel paths orthogonal to the common reflector 16.

In order to direct the actuators 20, the fiber optic collimation apparatus 10 can include a controller 28 that directs the actuators to position the respective optical fibers 12 in each of a plurality of positions relative to the respective collimating lenses 14. In addition, the controller is responsive to the detectors 18 and can analyze the magnitude of the return optical signals measured by the detectors to determine the position of each respective fiber for maximum magnitude of the return optical signals, thereby enabling the controller to direct the actuators to position each optical fiber in the desired location relative to each respective collimating lens.

By utilizing a common reflector 16 and positioning each of a plurality of optical fibers 12 in a concurrent manner, the fiber optic collimation apparatus 10 and method of the present invention can more efficiently align a plurality of optical fibers with respective collimating lenses 14, thereby improving the transmission and reception of optical signals by the optical fibers and correspondingly decreasing transmission losses, both in signal power and signal integrity. Importantly, the fiber optic collimation apparatus and method efficiently positions a plurality of optical fibers relative to respective collimating lenses by reflecting the collimated optical signals from a common reference mirror, thereby steering many collimated beams to illuminate or view the same target spot in the far field.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for collimating a plurality of optical signals comprising:
   a plurality of optical fibers for providing respective primary optical signals;
   a plurality of collimating lenses, each collimating lens positioned relative to one of said plurality of optical fibers for collimating the primary optical signal provided by said respective optical fiber to produce a collimated optical signal;
   a common reflector spaced from said plurality of collimating lenses and having a surface defining a reflection plane orthogonal to a direction of propagation of the collimated optical signals, wherein said common reflector reflects each of the collimated optical signals back to said respective collimating lens to produce a return optical signal from each collimated optical signal;
   at least one detector for receiving at least one return optical signal and for determining a magnitude of the return optical signal; and
   a plurality of actuators connected to respective optical fibers for iteratively positioning each optical fiber in a plurality of positions relative to said respective collimating lens,
   wherein said detector determines the magnitude of the return optical signal for each of the plurality of positions such that said actuator can position each optical fiber based upon the magnitude of the return optical signals.

2. An apparatus according to claim 1 wherein said plurality of collimating lenses lie in a common lens plane such that each respective collimated optical signal is parallel to all other collimated optical signals following alignment of said optical fibers.

3. An apparatus according to claim 2 wherein said plurality of collimating lenses are arranged in an array.

4. An apparatus according to claim 1 wherein each actuator comprises a microelectromechanical optical fiber alignment device for positioning a respective optical fiber.

5. An apparatus according to claim 4 wherein said microelectromechanical optical fiber alignment device positions said optical fiber in three orthogonal axes.

6. An apparatus according to claim 1 wherein said optical fiber receives the return optical signal and routes the return optical signal to said detector.

7. An apparatus according to claim 6 further comprising a plurality of light sources for providing the primary optical signals and a plurality of fiber optic directional couplers, each directional coupler interconnecting a respective light source, optical fiber and detector, each directional coupler providing the primary optical signal from the respective light source to said optical fiber and for receiving the respective return optical signal from said optical fiber and then routing the return optical signal to said detector.

8. An apparatus according to claim 1 wherein said actuator first moves the respective optical fiber such that the detector detects a return optical signal having a small magnitude and then the actuator iteratively positions the respective optical fiber such that the detector detects return optical signals having greater magnitudes.

9. An apparatus according to claim 1 wherein the actuator fixes each optical fiber at a position at which the return optical signals have the maximum magnitude.

10. An apparatus according to claim 1 further comprising a plurality of detectors for receiving return optical signals from respective optical fibers.

11. An apparatus according to claim 1 further comprising a controller for controlling the actuator based on the magnitude of the return optical signals received by the detector.

12. A method for collimating a plurality of optical signals comprising:
   providing a plurality of primary optical signals from respective optical fibers;
   individually collimating each of said plurality of primary optical signals to produce respective collimated optical signals;
   reflecting each collimated optical signal from a common reflection plane disposed orthogonal to a preferred direction of propagation of the collimated optical signals, thereby creating a return optical signal from each collimated optical signal;
   determining a magnitude of each return optical signal;
   iteratively positioning each optical fiber to a plurality of positions such that said providing, collimating, reflecting and determining steps are repeated at each of the plurality of positions; and
   fixing the position of each optical fiber in a final position based on the magnitude of the return optical signals.

13. A method according to claim 12 wherein said collimating step comprises collimating the primary optical signals such that all collimated optical signals are parallel to one another.

14. A method according to claim 12 wherein said positioning step comprises positioning each optical fiber in three orthogonal axes.

15. A method according to claim 12 further comprising providing a directional coupler for directing the primary optical signal to said optical fiber and for directing the respective return signal from said optical fiber to a detector.

16. A method according to claim 12 wherein the positioning step further comprises positioning the optical fibers such that the return optical signals have a small magnitude and then iteratively positioning the respective optical fibers such that the return optical signals have greater magnitudes.

17. A method according to claim 12 wherein fixing the position of the optical fiber comprises fixing the position of the respective optical fiber such that the return optical signals have a maximum magnitude.

* * * * *